United States Patent [19]
Chapman et al.

[11] Patent Number: 6,113,236
[45] Date of Patent: Sep. 5, 2000

[54] TORIC CONTACT LENSES

[75] Inventors: Judith E. Chapman, Victor; Paul M. Erickson, Kent, both of N.Y.

[73] Assignee: Bausch & Lomb Incorporated, Rochester, N.Y.

[21] Appl. No.: 09/049,246

[22] Filed: Mar. 27, 1998

Related U.S. Application Data

[60] Provisional application No. 60/041,922, Apr. 7, 1997.

[51] Int. Cl.$^7$ .................................................. G02C 7/04
[52] U.S. Cl. ................................. 351/160 R; 351/160 H
[58] Field of Search ........................... 351/160 R, 160 H, 351/161, 162

[56] References Cited

U.S. PATENT DOCUMENTS

| | | | |
|---|---|---|---|
| 4,508,436 | 4/1985 | Sitterle | 351/160 H |
| 4,573,774 | 3/1986 | Sitterle | 351/160 H |
| 5,455,641 | 10/1995 | Hahne et al. | 351/161 |
| 5,601,759 | 2/1997 | Apollonio | 264/2.5 |
| 5,611,970 | 3/1997 | Apollonio et al. | 264/2.5 |

FOREIGN PATENT DOCUMENTS

| | | |
|---|---|---|
| 0614105 | 9/1994 | European Pat. Off. . |
| 0742461 A2 | 11/1996 | European Pat. Off. . |
| 2281584 | 3/1976 | France . |
| 89/07303 | 8/1989 | WIPO . |

*Primary Examiner*—Scott J. Sugarman
*Attorney, Agent, or Firm*—John E. Thomas

[57] ABSTRACT

A toric contact lens includes a posterior surface and an anterior surface, one of these surfaces including a toric optical zone, and these surfaces being shaped to form a ballast. A diameter of the posterior optical zone and a diameter of the anterior optical zone are selected to minimize thickness of the lens based on the cylindrical correction of the lens.

22 Claims, 1 Drawing Sheet

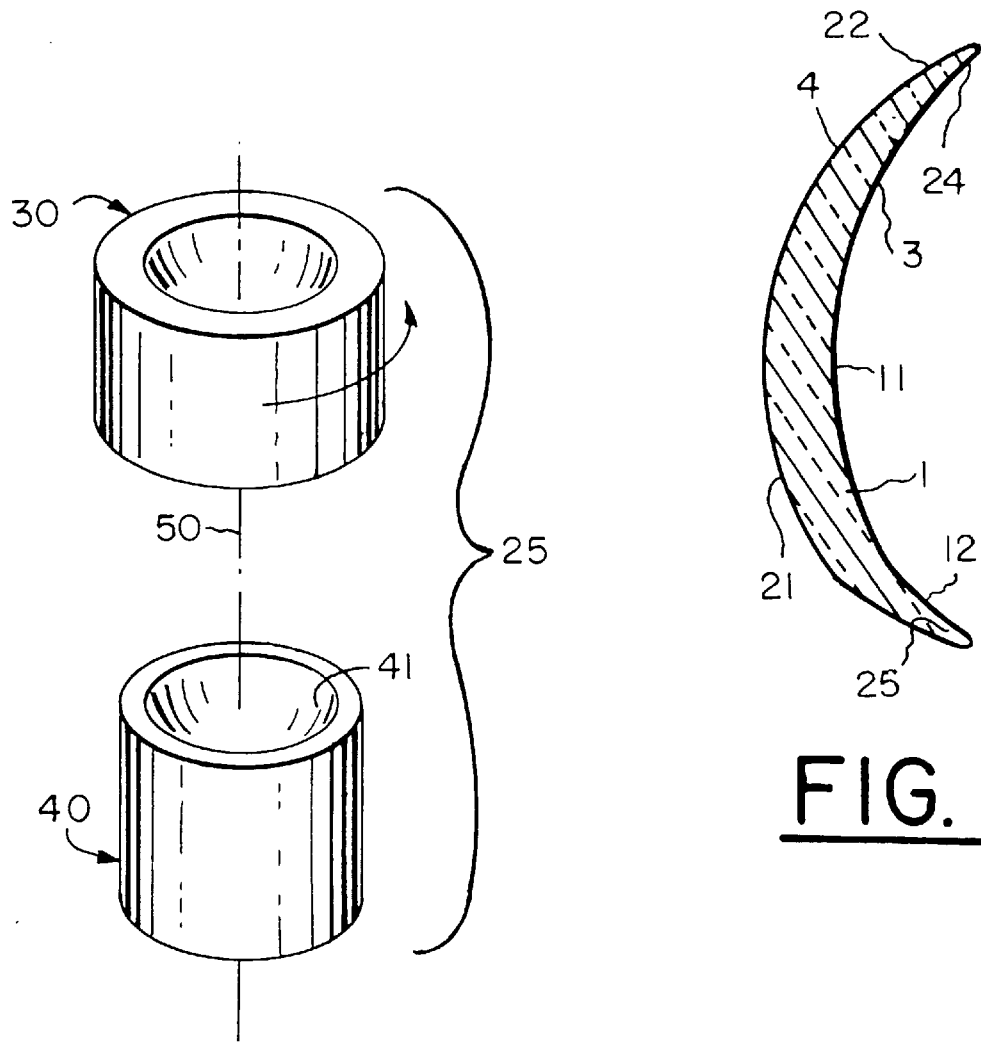
FIG. 1
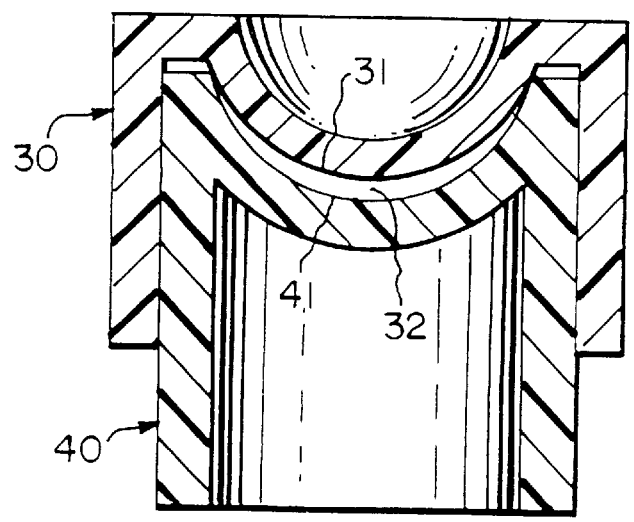
FIG. 2
FIG. 3

TORIC CONTACT LENSES

This application claims benefit of Provisional Appl. Ser. No. 60/041,922 filed Apr. 7, 1997.

Contact lenses having a toric optical zone (commonly referred to as "toric contact lenses") are used to correct refractive abnormalities of the eye associated with astigmatism. The toric optical zone provides cylindrical correction to compensate for the astigmatism. Since astigmatism requiring vision correction is usually associated with other refractive abnormalities, such as myopia (nearsightedness) or hypermetropia (farsightedness), toric contact lenses are generally prescribed also with a spherical correction to correct myopic astigmatism or hypermetropic astigmatism. The toric surface may be formed in either the posterior lens surface (back surface toric lens) or in the anterior lens surface (front surface toric lens).

Whereas spherical contact lenses may freely rotate on the eye, toric contact lenses have some type of ballast to inhibit rotation of the lens on the eye so that the cylindrical axis of the toric zone remains generally aligned with the axis of the astigmatism. For example, one or more sections of the lens periphery may be thicker (or thinner) than other sections to provide the ballast. Toric contact lenses are manufactured with a selected relationship (or offset) between the cylindrical axis of the toric optical zone and the orientation of the ballast. This relationship is expressed as the number of degrees (rotational angle) that the cylindrical axis is offset from the orientation axis of the ballast. Accordingly, toric contact lens prescriptions specify this offset, with toric lenses generally being offered in 5 or 10-degree increments ranging from 0° to 180°.

In summary, a prescription for a toric contact lens will typically specify spherical correction (power), cylindrical correction and axes offset to define the optical correction, as well as lens diameter and base curve to define fitting parameters.

In prescribing a patient with a toric contact lens, practitioners conventionally use sets of diagnostic contact lenses to determine which lens provides appropriate fitting characteristics and optical correction. It is desirable that lenses in such sets have consistent fitting characteristics over the range of optical corrections. However, a problem with toric contact lenses is that, in order to provide a series of toric lenses over a range of cylindrical corrections, thickness of the lenses in the series will typically vary considerably based on cylindrical correction; for example, higher cylinder lenses will have greater thickness in at least one portion of the lenses. This ultimately results in lenses in the series having different fitting characteristics, affecting on-eye comfort at certain cylindrical corrections, as well as affecting efficiencies in manufacturing the lenses.

Thus, a lens design which provides consistent fitting characteristics over a wide range of spherical and cylindrical corrections would be highly desirable.

FIG. 1 is a schematic cross-sectional illustration of a contact lens according to an embodiment of the invention.

FIG. 2 is a schematic exploded view of one embodiment of a mold assembly for cast molding contact lenses.

FIG. 3 is a schematic cross-sectional view of an assembled mold assembly shown in FIG. 2.

FIG. 1 schematically illustrates a representative toric contact lens 1. Central zone 11 of posterior surface 3 is toric, i.e., this zone has a toric surface that provides the desired cylindrical correction. Posterior surface 3 may include at least one peripheral curve 12 surrounding the central toric zone 11. For the described embodiment, central zone 21 of anterior surface 4 is spherical, and the spherical curve is matched with central zone 11 to provide the desired spherical correction to the lens. Anterior surface 4 may include at least one peripheral curve 22 surrounding central zone 21.

Toric lenses are provided with a ballast so that the lens maintains a desired rotational orientation on the eye. As one example, schematically shown in FIG. 1, lens 1 includes a prism ballast wherein peripheral section 24 has a different thickness than an opposed peripheral section 25 of the lens periphery. (Section 25 is at a "bottom" portion of the lens, since, when this type of toric lens is placed on the eye, the prism ballast is located downwardly.) The ballast is oriented about an axis, referred to herein as the "ballast axis". As discussed above, toric contact lens prescriptions define the offset of the ballast axis from the cylindrical axis of the toric zone by a selected rotational angle, the term "offset" being inclusive of rotational angles of 0 degrees or 180 degrees also, wherein the cylindrical axis is coincident with the ballast axis.

The present invention is based on several findings.

As mentioned, practitioners conventionally use sets of diagnostic contact lenses to determine which lens provides appropriate fitting characteristics and optical correction, and it is desirable that lenses in such sets have consistent fitting characteristics over the range of optical corrections. It is economically and practically preferable to use the smallest number of diagnostic lenses that will predict performance of the patient's prescription.

The thickness profile of a toric contact lens such as the lens shown in FIG. 1, i.e., the thickness of the contact lens at any nominal point on the lens, is affected by several factors, including spherical correction, cylindrical correction, axes offset, center thickness and ballast. Thus, for a series of contact lenses having different cylindrical corrections (but similar fitting characteristics such as a common effective base curve and overall diameter), the thickness of at least one section of the contact lens will vary based on the variations in the aforementioned factors.

The thickness profile of a toric contact lens strongly influences fitting and on-eye comfort. As mentioned, it is desirable that a series of contact lenses exhibit consistent fitting characteristics, and it is of course important that contact lenses are comfortable to a wearer.

Although spherical correction, cylindrical correction, and axes offset affect thickness profile, these parameters are dictated by the refractive error of a patient's eye, and therefore, from a lens design perspective, lenses must include these parameters in order to correct the refractive error.

Center thickness of the lens is dependent on spherical correction, and therefore, from a lens design perspective, only minimal adjustments can be made to center thickness to compensate for differences in thickness profile. Furthermore, for manufacturing processes such as cast molding, it is inefficient to try and vary center thickness among lenses in a series as a means to maintain a consistent thickness profile, as varying center thickness over a series of lenses requires a larger number of unique molds and tooling therefor.

In cast molding operations, the provision of a ballast into the lens is typically achieved by the offset between the anterior and posterior molding surfaces, and again, it is inefficient to adjust such offsets for a series of lenses as a means to maintain a constant thickness profile, since this would result in a much larger number of types of molds and tooling therefor being required. Furthermore, changes in ballast design over a series of toric contact lenses can affect fitting characteristics.

Applicant found, however, that by adjusting the diameters of the posterior and/or anterior optical zones, based on the cylindrical correction of a toric contact lens, the thickness profile of the lens can be maintained fairly constant over a series of lenses, including lenses having a range of cylindrical corrections. In other words, in a series of contact lenses having different cylindrical corrections, the thickness of lenses in the series, at any nominal section of lenses in the series, can be maintained consistent across the series. The diameters of the optical zones are selected based on the cylindrical correction of the lens. Therefore, fitting parameters such as effective base curve and lens diameter can be maintained constant throughout the series, and the optical zone diameters are selected to minimize variations in thickness of the lens based on the cylindrical correction of the lens.

This leads to several advantages. First, fitting parameters of the lens, as well as on-eye comfort, are consistent for the lens series. Second, from a manufacturing perspective, the variation in optical zones has a minimal effect on the number of unique molds and tools therefor that need to be maintained for molding such a series of toric contact lenses.

The invention is applicable for toric contact lenses having cylindrical corrections ranging from at least −0.75 diopter to −2.75, and even up to −3.75 diopter, −4.25 diopter and greater.

At any portion of the lens, each lens in the series will preferably have a thickness that is not more than 0.2 mm than other lenses in the series, more preferably no more than 0.15 mm. Thus, a consistent thickness profile is maintained throughout the lens series. Generally, each lens in the series will have a maximum thickness at a top of the optical zone of 0.2 mm, more preferably 0.19 mm. (The thickness at the "top" of the optical zone is the thickness at the highest optical zone juncture when the lens assumes its intended position on the eye. Thus, in the case of the configuration shown in FIG. 1, the thickness top of the optical zone is the thickness at the optical zone juncture furthest from the prism ballast.) Also, generally each lens will have a maximum thickness in the ballasted area of 0.5 mm, more preferably 0.4 mm. It is believed that thickness at these portions of the lens have a greater effect on fitting and comfort of the lens, and thicknesses above these maximum values will deleteriously affect on-eye comfort.

Each lens in the series will preferably have a posterior optical zone diameter of 6.5 to 10 mm, more preferably 7 to 8 mm, and an anterior optical zone diameter of 6.5 to 10 mm, more preferably, 7.8 to 9 mm. Generally, the diameter of the posterior optical zone will be smaller than or equal to a diameter of the anterior optical zone.

It has been found that, generally, the greatest variation in thickness profile among lenses in the series will be center thickness. (Center thickness is the thickness of the lens at is geometric center, i.e., at halfway along the overall lens diameter.) Nonetheless, center thickness will generally not vary more than about 0.2 mm among lenses in the series, and preferably no more than about 0.15 mm. However, it is believed that variations in center thickness affects fitting and on-eye comfort less that variations in thickness at the ballast and top of the optical zone junction, at least for the relatively small variations in center thickness achieved by the invention. It is preferred that each lens in the series has a maximum ballast thickness that is not more than 0.05 mm than other lenses in the series, preferably not more than 0.03 mm. It is also preferred that the each lens in the series has a maximum thickness at a top of the optical zone that is not more than 0.05 mm than other lenses in the series, preferably not more than 0.03 mm.

According to preferred embodiments, the lenses of this invention are cast molded by casting the lens between two mold sections, with an illustrative mold assembly is shown in FIGS. 2 and 3. The mold assembly includes posterior mold 30 having a posterior mold cavity defining surface 31 which forms the posterior surface of the molded lens, and anterior mold 40 having an anterior mold cavity defining surface 41 which forms the anterior surface of the molded lens. When the mold sections are assembled, a mold cavity 32 is formed between the two defining surfaces that corresponds to the desired shape of the contact lens molded therein. Each of the mold sections is injection molded from a plastic resin in an injection molding apparatus.

According to a preferred embodiment of the invention, the lenses have the general configuration shown in FIG. 1 and are formed by a cast molding process according to the method described in U.S. Pat. No. 5,611,970, the disclosure of which is incorporated herein by reference. An advantage of this lens configuration and cast molding method is that it minimizes the unique number of tools to cast mold toric lenses having different axes offsets, since the same mold sections can be used to mold lenses having the same spherical power/cylindrical correction and fitting parameters, but different axes offsets.

For this method, posterior mold cavity defining surface 31 has a toric central zone for forming a toric posterior surface of the toric contact lens that has a cylindrical axis, and anterior mold cavity defining surface 41 has a configuration that will provide ballast to a lens molded in molding cavity 32. Surfaces 31, 41 may also include curves for forming desired peripheral curves on the lens, and the central zones of surfaces 31, 41 may be designed to provide a desired spherical correction to the molded toric lens. In molding lenses, the rotational alignment of the anterior and posterior mold sections is adjusted to correspond with the selected offset between the cylindrical axis and the ballast. More specifically, after depositing a curable mixture of polymerizable monomers in anterior mold section 40, posterior mold section 30 may be rotated about axis 50 until alignment of this mold section is adjusted with respect to anterior mold section 40 at the selected rotational position. The mold sections are then assembled, or brought fully together, to assume the configuration shown in FIG. 3 while maintaining the selected rotational position. Alternately, anterior mold section 40 may be rotated about axis 50 until alignment is adjusted at the selected rotational position, followed by assembling the mold sections while maintaining the selected rotational position. Either of the mold sections may include a notch (or protrusion) which is engageable with a protrusion (or notch, respectively) on a support member of the cast molding system, or other means to ensure that this mold section is aligned at a known position with respect to the support member, and rotation of the mold sections with respect to one another can then be controlled to ensure the desired rotational position is maintained.

Subsequent to assembling the mold sections, the monomer mixture is polymerized, such as by exposure to UV light or heat, followed by disassembling the mold assembly and removing the molded lens therefrom. Other processing steps which may be included, depending on the specific process, include lens inspection, hydration in the case of hydrogel contact lenses, and lens packaging. An advantage of this cast molding method is that it minimizes the unique number of tools to cast mold lenses having different axes offsets.

Table 1 illustrates, based on several lenses in a series, how thickness profile is dependent on cylindrical power.

TABLE 1

| Cylinder (diopter) | Axis Offset (degrees) | Anterior OZ (mm) | Posterior OZ (mm) | Top OZ Thickness (mm) | Ballast Thickness (mm) |
|---|---|---|---|---|---|
| No Cyl | N/A | 9 | 8 | 0.146 | 0.368 |
| Low Cyl | 180 | 9 | 8 | 0.153 | 0.357 |
| Med Cyl | 90 | 9 | 8 | 0.149 | 0.366 |
| Med Cyl | 180 | 9 | 8 | 0.155 | 0.372 |
| High Cyl | 90 | 9 | 8 | 0.143 | 0.373 |
| High Cyl | 180 | 9 | 8 | 0.171 | 0.381 |

Table 2A illustrates, for the general toric lens configuration shown in FIG. 1, posterior designs based on lenses providing a cylindrical correction ranging from −0.75 diopter to −4.25 diopter. Table 2B illustrates suitable anterior designs that to be used in combination with the posterior designs in Table 2A. Table 2B also illustrates the expected center thickness when the anterior designs are used in combination with the posterior designs. Even though the center thickness variations ranged 0.145 mm over the series, a near constant thickness at the at the top optical zone juncture and ballast, consistent with the values shown in FIG. 1, can be maintained through proper selection of the optical zone diameters.

TABLE 2A

| Lens Cylinder (D) | Posterior OZ (mm) |
|---|---|
| 0.000 | 8.0 |
| −0.750 | 8.0 |
| −1.250 | 8.0 |
| −1.750 | 8.0 |
| −2.250 | 8.0 |
| −2.750 | 7.5 |
| −3.250 | 7.5 |
| −3.750 | 7.0 |
| −4.250 | 7.0 |

TABLE 2B

| Lens Sphere (D) | Anterior OZ (mm) | CT (mm) |
|---|---|---|
| 0.00 | 8.3 | 0.240 |
| −1.00 | 8.6 | 0.215 |
| −2.00 | 9.0 | 0.200 |
| −3.00 | 9.0 | 0.195 |
| −4.00 | 9.0 | 0.180 |
| −5.00 | 8.6 | 0.140 |
| −6.00 | 8.2 | 0.120 |
| −7.00 | 8.2 | 0.110 |
| −8.00 | 7.8 | 0.095 |
| −9.00 | 7.8 | 0.095 |

The lens designs in Tables 2A and 2B are suitable for forming lenses by a cast molding process according to the method described in U.S. Pat. No. 5,601,759, the disclosure of which is incorporated herein by reference, wherein a matrix of posterior and anterior mold types, each type incorporating a different posterior or anterior contact lens design, can be selectively combined to obtain a range of optical powers. This minimizes the need to have a unique posterior design for every unique anterior design, thus contributing to manufacturing efficiencies.

Although certain preferred embodiments have been described, it is understood that the invention is not limited thereto and modifications and variations would be evident to a person of ordinary skill in the art. As examples, this invention is applicable for toric lens ballast types (i.e., design features that inhibit rotation of the toric lens on the eye or facilitate the toric lens maintaining a desired orientation on the eye) other than that shown in FIG. 1, or the lens may have the toric zone in the anterior surface. Additionally, other forms of manufacturing the lenses will be evident to one skilled in the art.

We claim:

1. A toric contact lens including a posterior surface and an anterior surface, one of said surfaces including a toric optical zone and the other of said surfaces including a spherical optical zone, the anterior and posterior surfaces being shaped to form a ballast oriented about a ballast axis, wherein a diameter of the posterior optical zone and a diameter of the anterior zone are selected to minimize thickness of the lens based on the cylindrical correction of the lens.

2. The contact lens of claim 1, wherein the diameter of the posterior optical zone is smaller than or equal to a diameter of the anterior optical zone.

3. The contact lens of claim 1, wherein the lens has a prism ballast having a maximum thickness of 0.4 mm.

4. The contact lens of claim 1, wherein the lens has a maximum thickness at the top optical zone of 0.2 mm.

5. The contact lens of claim 4, wherein the maximum thickness at a top of the optical zone is 0.19 mm.

6. The contact lens of claim 1, wherein the diameter of the posterior optical zone is 6.5 to 10 mm, and the diameter of the anterior optical zone is 6.5 to 10 mm.

7. The contact lens of claim 6, wherein the diameter of the posterior optical zone is 7 to 8 mm, and the diameter of the anterior optical zone is 7.8 to 9 mm.

8. A series of toric contact lenses, each lens in the series including a posterior surface and an anterior surface, one of said surfaces including a toric optical zone and the other of said surfaces including a spherical optical zone, the anterior and posterior surfaces being shaped to form a ballast oriented about a ballast axis, each lens in the series having a common effective base curve and overall diameter but different cylindrical correction, wherein each lens in the series has a posterior optical zone diameter and an anterior optical zone diameter that are selected to optimize thickness of lens based on the cylindrical correction of the lens.

9. The series of claim 8, wherein each contact lens has a posterior optical zone diameter that is smaller than or equal to an anterior optical zone diameter.

10. The series of claim 8, wherein each contact lens has a prism ballast having a maximum thickness of 0.4 mm.

11. The series of claim 8, wherein each contact lens has a maximum thickness at a top of the optical zone of 0.2 mm.

12. The series of claim 11, wherein the maximum thickness at the top optical zone is 0.19 mm.

13. The series claim 8, wherein each contact lens has a posterior optical zone diameter of 6.5 to 10 mm, and an anterior optical zone diameter of 6.5 to 10 mm.

14. The series of claim 13, wherein each contact lens has a posterior optical zone diameter of 7 to 8 mm, and an anterior optical zone diameter of 7.8 to 9 mm.

15. The series of claim 8, wherein each lens in the series has a thickness at any portion of the lens that is not more than 0.2 mm than other lenses in the series.

16. The series of claim 8, wherein each lens in the series has a thickness at any portion of the lens that is not more than 0.15 mm than other lenses in the series.

17. A series of toric contact lenses, each lens in the series including a posterior surface and an anterior surface, one of said surfaces including a toric optical zone and the other of said surfaces including a spherical optical zone, the surfaces being shaped to form a ballast oriented about a ballast axis, each lens in the series having a common effective base curve and overall diameter but different cylindrical corrections ranging from at least −0.75 to −2.75, wherein each lens in the series has a thickness at any portion of the lens that is not more than 0.2 mm than other lenses in the series.

18. The series of claim 17, wherein each lens in the series has a thickness at any portion of the lens that is not more than 0.15 mm than other lenses in the series.

19. The series of claim 17, wherein each lens in the series has a maximum ballast thickness that is not more than 0.05 mm than other lenses in the series.

20. The series of claim 17, wherein each lens in the series has a maximum thickness at a top of the optical zone that is not more than 0.05 mm than other lenses in the series.

21. The series of claim 17, wherein each lens has a toric posterior optical zone.

22. The series of claim 21, wherein each lens has a prism ballast in the anterior surface.

* * * * *